United States Patent Office 3,379,728
Patented Apr. 23, 1968

3,379,728
PHENAZINE-1,4-DICARBOXYLIC ACIDS AND ESTERS THEREOF
Hans R. Schweizer, Herrliberg, Switzerland, assignor to Eastman Kodak Company, Rochester, N.Y., a corporation of New Jersey
No Drawing. Filed Sept. 12, 1966, Ser. No. 578,445
4 Claims. (Cl. 260—267)

ABSTRACT OF THE DISCLOSURE

Dialkylphenazine-1,4-dicarboxylates and dialkylphenazine-1,4-dicarboxylic acids which are useful as polymerization inhibitors and as intermediates in the production of other useful chemical compounds such as plasticizers are provided by the dehydrogenation or oxidation of the corresponding dialkyl-5,10 - dihydrophenazine-1,4-dicarboxylates.

---

This invention relates to a novel class of compounds, dialkyl phenazine-1,4-dicarboxylates and phenazine-1,4-dicarboxylic acids.

Phenazine and numerous derivatives thereof are well known in the art. Many of these compounds are dyes, belonging to the class known as azine dyes. Several known phenazine derivatives are useful as antibiotics.

It is an object of this invention to provide a new class of phenazine derivatives which are useful as polymerization inhibitors for unsaturated compounds, as intermediates in the preparation of other compounds such as diester plasticizers and fiber and film-forming polyesters and polyamides.

It is another object of this invention to provide dialkyl phenazine-1,4-dicarboxylates and phenazine-1,4-dicarboxylic acids.

These, and other objects, are attained by the practice of this invention which, briefly, comprises providing a dialkyl phenazine-1,4-dicarboxylate or a phenazine-1,4-dicarboxylic acid having the general formula

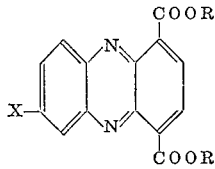

wherein each R is hydrogen or a lower alkyl group and X is hydrogen, halogen, nitro, lower alkyl, lower alkoxy, aryl or aryloxy.

As used herein, the terms lower alkyl and lower alkoxy mean such groups having straight or branched chain saturated aliphatic hydrocarbon radicals having from 1 to 6 carbon atoms.

The novel dialkyl phenazine-1,4-dicarboxylates of this invention may be prepared by the dehydrogenation or by the oxidation of the corresponding dialkyl 5,10-dihydrophenazine-1,4-dicarboxylates which have the general formula

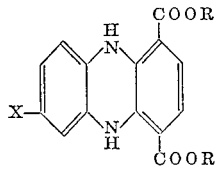

wherein X has the meaning described above and each R is lower alkyl.

The dialkyl 5,10-dihydrophenazine-1,4-dicarboxylates may be dehydrogenated by contacting a solution thereof in an inert solvent with a dehydrogenation catalyst or with an oxidation catalyst. Such catalysts are well known in the art and the particular catalyst used is not critical. A metal such as palladium supported on a carrier, such as calcium carbonate, is a suitable dehydrogenation catalyst. Sodium bichromate is an example of a suitable oxidation catalyst. The dehydrogenation reaction may be hastened by heating and it is preferred to conduct this reaction under reflux. The oxidation reaction may be conducted at room temperature.

If the dialkyl phenazine-1,4-dicarboxylate precipitates from the solution upon cooling, it may be recovered by filtration. If it does not readily precipitate, some or all of the solvent may be removed by evaporation. The product may be purified by recrystallization or by other techniques known to the art.

The novel phenazine-1,4-dicarboxylic acids of this invention may be prepared by the saponification of the corresponding dialkyl phenazine-1,4-dicarboxylates. The saponification may be accomplished by conventional techniques such as by heating a solution of the dialkyl phenazine-1,4-dicarboxylate with an alkali metal hydroxide such as sodium hydroxide or potassium hydroxide. The alkali metal salt of the acid is thereby formed which may be recovered by evaporation of the liquid reaction medium. The free acid may be obtained by dissolving the alkali metal salt of the acid in water and acidifying the solution. The free acid precipitates from solution and may be recovered by conventional techniques.

The novel dialkyl phenazine-1,4-dicarboxylates and phenazine-1,4-dicarboxylic acids of this invention are useful as intermediates in the preparation of organic compounds such as plasticizers and linear polyesters. For example, they may be condensed with a glycol, such as ethylene glycol, tetramethylene glycol, pentamethylene glycol, decamethylene glycol, 1,5-pentanediol, 2-methyl-1,5-pentanediol, etc., using a conventional esterification or ester interchange catalyst to prepare polyesters. There may also be used to modify the properties of conventional polyesters, such as polyethylene terephthalate, by being substituted for a portion of the conventional dicarboxylic component, such as terephthalic acid or dimethyl terephthalate, in the preparation of the polyester. The polyesters are useful for the production of films, fibers, molded objects, etc.

The novel dialkyl phenazine-1,4-dicarboxylates and phenazine-1,4-dicarboxylic acids are also useful in the manufacture of diester plasticizers by reaction with an alcohol, e.g., 2-ethylhexanol, etc. Such diester plasticizers can be prepared by direct esterification of the phenazine-1,4-dicarboxylic acids in a conventional manner or by a conventional ester interchange reaction with a dialkyl phenazine-1,4-dicarboxylate.

The dialkyl phenazine-1,4-dicarboxylates are also useful as polymerization inhibitors for ethylenically unsaturated compounds.

The phenazine-1,4-dicarboxylic acids are also useful intermediates in the preparation of phenazine-1,4-derivatives, of ultraviolet stabilizers and oxidation inhibitors containing a phenazine nucleus, of non-tendering acylaminoanthraquinone vat dyes, and of pharmaceuticals.

The following examples illustrate the preparation of certain of the dialkyl phenazine-1,4-dicarboxylates of my invention.

EXAMPLE 1

Diethyl 5,10-dihydrophenazine-1,4-dicarboxylate (300 mg.; 0.9 millimole) was dissolved in 4 ml. of nitrobenzene. To this solution, there were added 150 mg. of dehydrogenation catalyst (5% palladium on calcium carbonate) and the mixture was boiled for one hour. During this time, a slight current of air was passed through the mixture.

Subsequently, the catalyst was removed from the reaction mixture by filtration, the nitrobenzene was removed by distillation under reduced pressure, and the residue was recrystallized once from cyclohexane and twice from a mixture of cyclohexane and acetone, yielding 130 mg. of yellow diethyl phenazine-1,4-dicarboxylate having a melting point of 103–104° C. A microanalysis yielded the following results:

Calculated for $C_{18}H_{16}N_2O_4$: C, 66.66; H, 4.97; N, 8.64%. Found: C, 66.59; H, 4.88; N, 8.44%.

A comparison of the n.m.r.-spectrum of the new compound with the n.m.r.-spectrum of the starting material showed that the two hydrogen atoms in the 5 and 10 positions (i.e., on the nitrogen atoms) had disappeared.

EXAMPLE 2

In 30 ml. of acetic acid, there was suspended diethyl 5,10 - dihydrophenazine - 1,4 - dicarboxylate (1.63 g.; 5 millimole). Thereafter, a solution of an oxidation reagent, sodium bichromate (0.5 g.; 1.6 millimole) in 30 ml. of acetic acid, was slowly added with stirring at room temperature. Stirring was continued for 30 minutes. Then, 80 ml. of water were added to the reaction mixture, which was then filtered, yielding diethyl phenazine-1,4-dicarboxylate (1.4 g.; 4.3 millimoles) in the form of greenish yellow needles having a melting point of 102–104° C. Recrystallization of the product from petrol ether yielded needles with a melting point of 104° C. Analysis of this substance proved it to be identical with the compound obtained in Example 1.

EXAMPLE 3

Diethyl 5,10 - dihydro - 7 - nitrophenazine - 1,4 - dicarboxylate (0.75 g.; 0.002 mole) was suspended in 20 ml. of acetic acid. A solution of 0.34 g. of sodium bichromate in 10 ml. of acetic acid was slowly added with stirring at room temperature. After 30 minutes, water was added and the reaction mixture was filtered. The product, which was collected by filtration, was recrystallized from ethanol. There was thus obtained 0.65 g. of diethyl 7-nitrophenazine-1,4-dicarboxylate in the form of dull yellow needles. This material was determined to have a melting point of 122° C. The compound analyzed as follows:

Calculated for $C_{18}H_{15}N_3O_6$: C, 58.53; H, 4.09; N, 11.38%. Found: C, 58.44; H, 4.00; N, 11.17%.

Other dialkyl phenazine-1,4-dicarboxylates may be prepared by the processes of the foregoing examples and the preceding general description. Thus, when the processes of Examples 1 and 3 are repeated substituting dimethyl 5,10 - dihydrophenazine - 1,4 - dicarboxylate and dimethyl 5,10-dihydro-7-nitrophenazine-1,4-dicarboxylate, respectively, for the corresponding diethyl 5,10-dihydrophenazine-1,4-dicarboxylates used in those examples, there are obtained dimethyl phenazine-1,4-dicarboxylate and dimethyl 7-nitrophenazine-1,4-dicarboxylate, respectively. When the processes of Examples 1 and 3 are repeated substituting dipropyl 5,10-dihydrophenazine-1,4-dicarboxylate and dipropyl 5,10-dihydro-7-nitrophenazine-1,4-dicarboxylate, respectively, for the corresponding diethyl 5,10 - dihydrophenazine - 1,4 - dicarboxylates used in those examples, there are obtained dipropyl phenazine-1,4 - dicarboxylate and dipropyl 7 - nitrophenazine-1,4-dicarboxylate, respectively. Similarly, when the processes of Examples 1 and 3 are repeated substituting dibutyl 5,10 - dihydrophenazine - 1,4 - dicarboxylate and dibutyl 5,10 - dihydro - 7 - nitrophenazine - 1,4 - dicarboxylate, respectively, for the corresponding diethyl 5,10-dihydrophenazine-1,4-dicarboxylates used in those examples, there are obtained dibutyl phenazine-1,4-dicarboxylate and dibutyl 7-nitrophenazine-1,4-dicarboxylate, respectively. Also, when the process of Examples 1 and 3 are repeated substituting dihexyl 5,10 - dihydrophenazine - 1,4 - dicarboxylate and dihexyl 5,10-dihydro-7-nitrophenazine-1,4-dicarboxylate respectively, for the corresponding diethyl 5,10-dihydrophenazine-1,4-dicarboxylates used in those examples, there are obtained dihexyl phenazine-1,4-dicarboxylate - and - dihexyl 7 - nitrophenazine - 1,4 - dicarboxylate, respectively.

Other compounds which may be prepared include, for example, diisopropyl phenazine-1,4-dicarboxylate, diisobutyl 7 - methylphenazine - 1,4 - dicarboxylate, diamyl phenazine - 1,4 - dicarboxylate, diamyl - 7 - nitrophenazine - 1,4 - dicarboxylate, dimethyl 7 - chlorophenazine-1,4 - dicarboxylate, diethyl 7 - bromophenazine - 1,4-dicarboxylate, diisopropyl 7 - propylphenazine - 1,4 - dicarboxylate, diethyl 7 - hexylphenazine - 1,4 - dicarboxylate, diethyl 7-methoxyphenazine-1,4-dicarboxylate, diethyl 7 - ethoxyphenazine - 1,4 - dicarboxylate, diethyl 7 - butoxyphenazine - 1,4 - dicarboxylate, diethyl 7-phenylphenazine - 1,4 - dicarboxylate, dimethyl 7 - phenoxyphenazine - 1,4 - dicarboxylate, diethyl 7 - p - methylphenylphenazine-1,4-dicarboxylate and diethyl 7-o-ethylphenylphenazine - 1,4 - dicarboxylate.

The following example illustrates the preparation of one of the novel phenazine-1,4-dicarboxylic acids of my invention.

EXAMPLE 4

A solution of diethyl phenazine-1,4-dicarboxylate (2.0 millimoles; 700 mg.) and 120 mg. of sodium hydroxide in 40 ml. of ethanol was refluxed for 2 hours. During the period of heating, a precipitate was formed. The solution was evaporated to dryness, the residue containing the sodium salt of phenazine-1,4-dicarboxylic acid, was dissolved in water and the solution was filtered. The filtrate was recovered and acidified by the addition of acetic acid. A precipitate was formed which was recovered by filtration. The yellow product (530 mg.) was recrystallized from dimethylformamide to yield 400 mg. of phenazine-1,4-dicarboxylic acid in the form of dull yellow needles having a melting point above 300° C.

For the microanalysis, the product was recrystallized once again from dimethylformamide and the crystals were boiled for 1 hour in water to remove all dimethylformamide. The crystals were then dried for 72 hours at 90° C. at a pressure of 0.005 mm. of Hg. The microanalysis yielded the following results:

Calculated for $C_{14}H_3N_2O_4$: C, 62.69; H, 3.01; N, 10.45%. Found: C, 62.66; H, 3.14; N, 10.58%.

Other phenazine-1,4-dicarboxylic acids may be prepared by the process of the foregoing example and the preceding general description. Thus, when the process of Example 1 is repeated substituting diisobutyl 7-methylphenazine-1,4-dicarboxylate,
dimethyl 7-chlorophenazine-1,4-dicarboxylate,
diethyl 7-bromophenazine-1,4-dicarboxylate,
diisopropyl 7- propylphenazine-1,4-dicarboxylate,
diethyl 7-hexylphenazine-1,4-dicarboxylate,
diethyl 7-methoxyphenazine-1,4-dicarboxylate,
diethyl 7-ethoxyphenazine-1,4-dicarboxylate,
diethyl 7-butoxyphenazine-1,4-dicarboxylate,
diethyl 7-phenylphenazine1,4-dicarboxylate,
dimethyl 7-phenoxyphenazine-1,4-dicarboxylate,
diethyl 7-p-methylphenoxyphenazine-1,4-dicarboxylate and diethyl 7-o-ethylphenylphenazine-1,4-dicarboxylate, respectively, for the diethyl phenazine-1,4-dicarboxylate used in that example, there are obtained 7-methylphenazine-1,4-dicarboxylic acid,
7-chlorophenazine-1,4-dicarboxylic acid,
7-bromophenazine-1,4-dicarboxylic acid,
7-propylphenazine-1,4-dicarboxylic acid,
7-hexylphenazine-1,4-dicarboxylic acid,
7-methoxyphenazine-1,4-dicarboxylic acid,
7-ethoxyphenazine-1,4-dicarboxylic acid,
7-butoxyphenazine-1,4-dicarboxylic acid,
7-phenylphenazine-1,4-dicarboxylic acid,
7-phenoxyphenazine-1,4-dicarboxylic acid,
7-p-methylphenoxyphenazine-1,4-dicarboxylic acid, and
7-o-ethylphenylphenazine-1,4-dicarboxylic acid.

The dialkyl 5,10-dihydrophenazine-1,4-dicarboxylates which are dehydrogenated to prepare the novel compounds of this invention may themselves be prepared by dehydrogenation of the corresponding dialkyl 1,2,3,4-tetrahydrophenazine-1,4-dicarboxylates. The following example is illustrative of the preparation of dialkyl 5,10-dihydrophenazine-1,4-dicarboxylates:

EXAMPLE 5

Through a boiling solution of diethyl 1,2,3,4-tetrahydrophenazine-1,4-dicarboxylate (6.6 g.; 0.02 mole) in 50 ml. of xylene which contains 2.5 g. of a dehydrogenation catalyst (5% palladium on calcium carbonate), there was passed a slight current of air over a period of 1½ hours. The solution was then cooled, filtered to remove the catalyst and concentrated by distillation. After cooling again, red needles with a melting point of 156–157° C. crystallized from the solution. Four grams of product, diethyl 5,10 - dihydrophenazine - 1,4-dicarboxylate (0.012 mole) were recovered. Thin layer chromatography showed that the compound was pure. A sample of the substance was recrystallized twice from ethanol. The melting point of the recrystallized product remained at 156–157° C. The following microanaysis was obtained therefrom:

Calculated for $C_{18}H_{18}N_2O_4$: C, 66.24; H, 5.56; N, 8.58%. Found: C, 66.25; H, 5.60; N, 8.57%.

The structure of the compound as a 5,10-dihydro derivative was proved by its n.m.r. spectrum showing a signal at 9.2 p.p.m. with an intensity of 2 protons and corresponding to the group phenyl-NH-phenyl.

Other dialkyl 5,10 - dihydrophenazine - 1,4-dicarboxylates may be prepared in a similar manner. Thus, when the processes of Example 5 is repeated substituting dimethyl and dipropyl 1,2,3,4-tetrahydrophenazine-1,4-dicarboxylates or diethyl 7-nitro-1,2,3,4-tetrahydrophenazine-1,4-dicarboxylate for the corresponding diethyl 1,2,3,4-tetrahydrophenazine-1,4-dicarboxylate used in Example 5, there are obtained the corresponding dimethyl, dipropyl, and diethyl 7-nitro-5,10-dihydrophenazine-1,4-dicarboxylates.

Dialkyl 1,2,3,4-tetrahydrophenazine-1,4-dicarboxylates are obtained by reacting a dialkyl 1,2-cyclohexanedione-3,6-dicarboxylate having the general formula

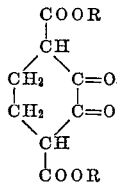

wherein R is the same as defined above with an o-phenylenediamine having the general formula

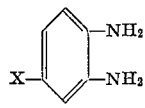

wherein X is the same as described above.

The dialkyl 1,2-cyclohexanedione-3,6 - dicarboxylates which are used as reactants in preparing the dialkyl 1,2,3,4-tetrahydrophenazine - 1,4 - dicarboxylates may be prepared by reacting in the presence of two moles of a sodium alkylate one mole of a dialkyl oxalate having the formula

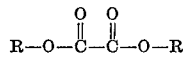

and one mole of a dialkyl adipate having the formula

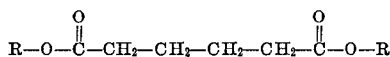

wherein each R is the same as described above. The sodium alkylate which is used as a cyclo-condensation catalyst should correspond to the alcohol portion of the ester, i.e., sodium ethylate is used with ethyl esters of oxalic and adipic acids. A slight excess of dialkyl oxalate and sodium alkylate may be employed. The dialkyl 1,2-cyclohexanedione-3,6-dicarboxylate is separated and isolated from the resulting mixture of condensation products by treating the latter with dilute aqueous alkali, whereby its insoluble alkali salt is formed.

Examples of the R group in the above general formulas include methyl, ethyl, propyl or butyl groups. Representative of the X group in the above general formulas, other than hydrogen and nitro previously mentioned, are chloro, bromo, methyl, ethyl, propyl, butyl, methoxy, ethoxy, propoxy, butoxy, phenyl and phenoxy.

The following example is illustrative of the method of preparation of a dialkyl 1,2-cyclohexanedione-3,6-dicarboxylate:

EXAMPLE 6

Sodium ethylate (34.0 g.; 0.5 mole) was suspended in 200 ml. of dry diethyl ether. Diethyl oxalate (36.5 g.; 0.25 mole) was added with stirring. After 15 minutes, there was then added diethyl adipate (50.5 g.; 0.25 mole) and the mixture was refluxed for one hour with stirring. The ether was then removed by distillation and the residue was warmed to 120–130° C. resulting in the evolution of ethanol. The reaction mixture was held for four hours at 120–130° C. after which time the evolution of ethanol was complete. The mixture was then cooled and the brown reaction mass was carefully acidified by the addition of 330 ml. of 10% aqueous sulfuric acid. The resultant brown oil was extracted with a small amount of diethyl ether. The ether extract was treated with an equal volume of 2N sodium hydroxide solution. The ether extract was then diluted with an equal volume of fresh ether and the aqueous alkaline portion was diluted with an equal volume of distilled water. Subsequently, the white salt which had precipitated was recovered by filtration. The salt was washed with a small amount of normal sodium hydroxide solution, then with some ether and dried as much as possible by suction. The wet salt was then treated with a small amount of dilute hydrochloric acid to convert it into free diketone. The diketone was recrystallized from ethanol. The product, diethyl 1,2-cyclohexanedione-3,6-dicarboxylate (3.9 g.), was determined to have a melting point of 57–58° C. The compound analyzed as follows:

Calculated for $C_{12}H_{16}O_6$: C, 56.24%; H, 6.29%. Found: C, 56.25%; H, 6.23%.

The infra-red absorption spectrum showed keto bands at 5.75, 5.85, 6.00 and 6.20 microns.

The following example illustrates the preparation of dialkyl 1,2,3,4-tetrahydrophenazine - 1,4 - dicarboxylates which may be dehydrogenated to prepare dialkyl 5,10-dihydrophenazine-1,4-dicarboxylates.

EXAMPLE 7

Diethyl 1,2 - cyclohexanedione - 3,5 - dicarboxylate (12.8 g.; 0.05 mole) was suspended in a mixture of 60 ml. of ethanol and 5 ml. of acetic acid. The mixture was heated to reflux and sublimed o-phenylenediamine (5.4 g.; 0.05 mole) dissolved in 40 ml. of ethanol was added. Thereafter, the solution was reffuxed for 1 hour. It was then cooled to 0° C. Diethyl 1,2,3,4-tetrahydrophenazine-1,4-dicarboxylate was recovered from the solution by filtration as an orange-yellow solid. It was determined to have a melting point of 96° to 97° C. The product (14.6 g.) was obtained in an 89.5% of theoretical yield. It was then recrystallized twice from ethanol. The recrystallized material had a melting point of 99° C. The compound had the following analysis:

Calculated for $C_{18}H_{20}N_2O_4$: C, 65.84; H, 6.14; N, 8.53%. Found: C, 65.83; H, 6.20; N, 8.61%.

Although the invention has been described in considerable detail with particular reference to certain preferred embodiments thereof, variations and modifications can

I claim:
1. A compound of the formula:

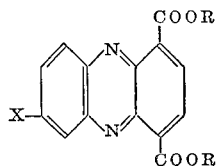

wherein each R is hydrogen or lower alkyl group and X is hydrogen, halogen, nitro, lower alkyl, lower alkoxy, phenyl, methylphenyl, ethylphenyl, phenoxy, and methyl phenoxy.

2. A compound according to claim 1 in which the compound is diethyl phenazine-1,4-dicarboxylate.

3. A compound according to claim 1 in which the compound is diethyl 7-nitrophenazine-1,4-dicarboxylate.

4. A compound according to claim 1 in which the compound is phenazine-1,4-dicarboxylic acid.

No References Cited.

HENRY R. JILES, *Primary Examiner.*